United States Patent [19]
Emonts et al.

[11] Patent Number: 4,618,538
[45] Date of Patent: Oct. 21, 1986

[54] COLORED ENAMEL COMPOSITION FOR OBTAINING DECORATIVE LAYERS OF FLOAT GLASS SHEETS

[75] Inventors: Heinfried Emonts, Aachen; Franz Gebhardt, Wurselen, both of Fed. Rep. of Germany

[73] Assignee: Saint-Gobain Vitrage, Aubervilliers, France

[21] Appl. No.: 775,286

[22] Filed: Sep. 12, 1985

[30] Foreign Application Priority Data

Sep. 12, 1984 [DE] Fed. Rep. of Germany ....... 3433408

[51] Int. Cl.$^4$ .......................... B32B 17/06; B05D 5/00
[52] U.S. Cl. ..................................... 428/428; 65/60.1; 65/60.5; 65/90; 65/99.2; 428/38; 428/210; 501/14; 501/18; 501/22; 501/76
[58] Field of Search ........................... 501/76, 14, 18; 65/60.1, 60.5, 99.2, 90; 428/428, 210, 38

[56] References Cited

U.S. PATENT DOCUMENTS 3,331,777 7/1967 Hoffman ............................... 501/18
4,473,612 9/1984 Behr et al. ............................ 65/60.1
4,520,115 5/1985 Speit et al. ............................. 501/76

Primary Examiner—Helen M. McCarthy
Attorney, Agent, or Firm—Pennie & Edmonds

[57] ABSTRACT

A glass glazing is provided with a coating of a colored enamel composition along one or more edges. The enamel composition includes a vitreous matrix pigment and from 2 to 5% by weight of powdered tin dioxide which preferably is an additive during a comminution step. The vitreous matrix which represents at least 75% by weight of the enamel composition includes the following constituents SiO: 25–33 (% by weight)
PbO: 47–65
$B_2O_3$: 3–7
$Na_2O$: 1–4
$K_2O$: 0–2
$Li_2O$: 0–0.8
ZnO: 0.2–0.5 and provides a molar ratio of $SiO_2$ to PbO between 1.6 and 2.7. The total content of the alkaline oxide are less than 5% by weight.

The linear thermal expansion coefficient of the vitreous matrix is less than the glazing to be coated.

14 Claims, No Drawings

4,618,538

COLORED ENAMEL COMPOSITION FOR OBTAINING DECORATIVE LAYERS OF FLOAT GLASS SHEETS

DESCRIPTION

1. Technical Field

The invention is in a colored enamel composition for forming enamel coatings on float glass glazings. The enamel coating which may be decorative includes a vitreous matrix and embedded pigments. The baking temperature of the colored enamel composition will correspond approximately to the softening temperature of the float glass glazing.

2. Background of the Invention

It has been found that opaque enamel coatings are being applied to automobile glazings in ever increasing number. These coatings of opaque material may comprise a form of frame along an edge or edges of the glazing, used in the process of gluing the glazing to the automobile body. Thus, the coating provides a utilitarian function, namely that of hiding a bead of glue from view from the front of the glazing. The coating also may serve the function of increasing the degree of adhesion between the automobile body and the glazing.

The opaque enamel coating may also be used to achieve a decorative effect. To this end, the opaque enamel coating may be applied to the glazing as either a continuous or discontinuous layer.

The opaque enamel coating of the prior art may include a molten vitreous phase and colored pigment.

It has been found that the ultimate bending strength of a float glass glazing coated with a known opaque enamel coating is substantially less than the ultimate bending strength of a float glass glazing that is not coated. Particularly, known enamels marketed for the purposes indicated, substantially without exception, and in the most favorable cases, have been found to reduce the ultimate bending strength of the coated glazing by as much as 40%. Thus, the ultimate bending strength of the coated glazing is at most about 60% of the ultimate bending strength of a like glazing, not coated.

A reduction of the ultimate bending strength of coated glazings is a drawback particularly in situations requiring increased strength properties. This is the case with automobile glazings.

SUMMARY OF THE INVENTION

The invention provides an enamel composition and a range of the same, for coating a float glass glazing. The enamel composition will provide both a decorative and utilitarian function without the coated glazing demonstrating a substantial reduction in ultimate bending strength. According to the invention, the reduction in ultimate bending strength of the coated glazing will be less than one-half the reduction recognized in the prior art.

The enamel composition, also, will assure a satisfactory bond between the enamel layer and the surface of the float glass glazing. Thus, the enamel composition will exhibit good adhesion to the surface of the float glass glazing, during baking, to achieve a satisfactory chemical bond by mutual diffusion and formation of intermediate phases.

According to the invention, the significant results are achieved by the provision of an enamel composition including at least 75% by weight vitreous matrix having a composition, by weight, of $SiO_2$: 25–33
PbO: 47–65
$B_2O_3$: 3–7
$Na_2O$: 1–4
$K_2O$: 0–2
$Li_2O$: 0–0.8
ZnO: 0.2–5 pigment and up to about 5% by weight of tin dioxide powder added during the comminution of the vitreous matrix and pigment powders. The vitreous matrix of the enamel composition will have a molar ratio of $SiO_2$ to PbO between about 1.6 and 2.7, preferably between 1.8 and 2.3, and a total content of less than 5% by weight alkaline oxides. Further, the linear thermal expansion coefficient of the vitreous matrix, in the range of temperature of 20 to 300° C., is less than that of the float glass glazing to be coated.

BEST MODE FOR CARRYING OUT THE INVENTION

The invention is founded on observations that both chemical and physical processes may result in a reduction of certain strength characteristics or properties of coated float glass glazings and more particularly that the strength properties are affected primarily by the properties of the vitreous matrix of the enamel composition. It has also been observed that the pigment provided with the enamel layer may have an influence on the strength property of float glass glazings. This reduction of strength has been found noticeable under circumstances that the enamel composition includes a pigment content in excess of 18% by weight.

The invention in one aspect is directed to an enamel composition for use in forming an enamel coating layer on a float glass glazing, and as more particularly described in the Examples to follow, the maintainence of the major constituents of the enamel composition within limits according to percentage by weight.

Float glass to be coated may have the following constituents (in % percentage by weight):

$SiO_2$: 70–73
CaO: 8–10
MgO: 3–5
$Na_2O$: 12–14.5
$K_2O$: 0–1.

Another aspect of the invention concerns the implementation of certain oxides and other compounds which may be present in the vitreous matrix of the enamel composition, and the limitations of their use, likewise in percent by weight of the enamel composition. For example, it has been found that zinc oxide provides the favorable effect of improving the flow properties of the molten vitreous matrix, and zinc oxide has been used successfully. Zinc oxide has the side benefit in substitution for cadmium oxide, typically used for this purpose, that zinc oxide rather than being toxic is completely inoffensive.

According to the invention, it is important that the content of lithium oxide in the vitreous matrix be maintained in an amount no greater than about 0.8% by weight. To this end, apparently because of the effect of diffusion processes, intermediate phases containing lithium oxide have been found in surface layers of the float glass glazing coated with the enamel composition. Thus, while lithium oxide has the beneficial effect of enhancing the property of adhesion of the enamel composition to the float glass glazing and the aptitude for using colored compositions, lithium oxide also has an unfavorable effect on the strength properties of the coated float glass glazings. The unfavorable effect, however, is not due to the influence of lithium oxide, alone, and it has been found that all of the features of the invention may be simultaneously realized by maintenance of the major and minor constituents within stated limits according to percentages by weight.

A further improvement of the invention is realized by the addition of tin dioxide in an amount up to 1.8% by weight of the vitreous matrix. While the solubility of $SnO_2$ in the molten glass, as compared to other constituents of the vitreous matrix, is relatively slight, it has been found that the $SnO_2$ is dissolved in the vitreous matrix in the amount indicated to participate in increasing the bending strength of the float glass glazings coated with an enamel layer. The tin dioxide, also, increases the chemical resistance of the enamel layer.

According to an embodiment of the invention, heavy metal oxides such as the oxides of chromium, iron, nickel, cobalt, manganese and copper have a favorable effect on the desired properties of the coated float glass glazings. These oxides dissolved in the vitreous matrix serve as colorants thereby to permit a reduction in the pigment content of the enamel composition. The reduction of pigment content is important in its effect on the ultimate bending strength of the float glass glazings coated with enamel. According to the invention, the heavy metal oxides may be added in an amount up to about 5% by weight, and preferably about 3% by weight.

Other oxides, such as the oxides of calcium, magnesium and aluminum in an amount up to about 2% by weight may also be present in the molten composition. These oxides, in relation to the heavy metal oxides have only a negligible overall effect on the desired properties.

Colored compositions used for the usual float glass compositions are chosen for the vitreous matrix within a range of compositions exhibiting a linear thermal expansion coefficient (in the range of 20° to 300° C.) $\alpha 20\text{-}300=(70 \text{ to } 79)\times 10^{-7}\,°C.^{-1}$. Since the usual float glass has a linear thermal expansion coefficient between $(85 \text{ and } 92)\times 10^{-7}°C.^{-1}$, the ratio of the linear thermal expansion coefficient of the vitreous matrix to that of the float glass will be about 82 to 92%. Thus, tension stresses possibly resulting in hairline cracks propogating in the glass surface which effect bending strength are prevented from appearing in the enamel layer during cooling.

The invention is further described in the Examples which follow below:

EXAMPLE 1

A base enamel is made to melt as vitreous matrix for a colored composition. The base enamel has the following analysis, in percent by weight, $SiO_2$: 28.14
PbO: 56.29
$B_2O_3$: 5.08
$Na_2O$: 1.47
$K_2O$: 0.19
$Li_2O$: 0.44
ZnO: 5.00
CaO: 0.81
MgO: 0.33
$Al_2O_3$: 0.02
$Fe_2O_3$: 0.18
CoO: 0.41
MnO: 0.37
NiO: 0.44
CuO: 0.44
$Cr_2O_3$: 0.03 and a molar ratio of $SiO_2$ to PbO of 1.86.

The molten mass of base enamel is soaked in a water bath, then subjected to gross crushing, comminution by fractions in a mill of suitable type, a remelting and a further communition to better homogenize the base enamel.

The base enamel of the above analysis has a dark blue color. The color is the result of the total content of heavy metal oxides in an amount by weight of about 2%. The base enamel is particularly suitable as a vitreous matrix for very dark shades. The color of the base enamel may be changed by adding pigmentation to the base material of the above analysis. For example, a black enamel may be prepared by the addition of 18 parts by weight of crystalline black spinel, that is, copper chromite and/or magnetite-type spinel to 78 parts by weight of base enamel.

A linear thermal expansion coefficient determination of the base enamel may be deduced for this determination. At the start, base enamel in the molten state is poured into a mold to form a small enamel rod. The rod may have a length of about 5 cm and the rod is allowed to cool in the mold without introduction of stress. The thermal expansion of the test rod within a temperature range from 20° to 500° C. is determined in accordance with DIN 52.328. The determination is made by a differential dilatometer. The linear thermal expansion coefficient of the base enamel is $\alpha 20\text{-}300=(75\pm 2)\times 10^{-7}\,°C.^{-1}$. The value is deduced from a plotted curve for the linear thermal expansion coefficient. The behavior of the base enamel at the melting point is determined with a heating microscope following DIN 51.730. The base enamel was found to have a sintering point of 418° C. and an ash melting point of 698° C.

The enamel composition in addition to the pigment constituent and the composition of vitreous matrix also includes tin oxide in an amount of 4 parts by weight. The tin dioxide comprises an additive during joint comminution of the vitreous matrix powder and pigment powder.

The enamel composition is ground wet to the desired particle size. The enamel powder, then, is dried and again homogenized in a mixer of suitable type. The ultimate bending strength of uncoated float glass glazings are compared with the ultimate bending strength of float glass glazings coated with the enamel composition.

Float glass of the following composition was used as test glazing samples:

$SiO_2$: 72.36%
$Al_2O_3$: 0.62%
$Fe_2O_3$: 0.13%
$TiO_2$: 0.12%
CaO: 8.67%
MgO: 3.88%
$SO_3$: 0.23%
$Na_2O$: 13.64%
$K_2O$: 0.33%

The test glazing samples have a planar dimension of 10 cm×10 cm, and a thickness of 1.55 mm.

The linear thermal expansion coefficient of the test glazing samples of float glass was found to be $\alpha 2\text{-}0\text{-}300=(85\pm 2)\times 10^{-7}\,°C.^{-1}$. The determination was made in accordance with DIN 52.328. Accordingly, the ratio of the linear thermal expansion coefficient of the vitreous matrix of the enamel composition to that of the float glass is 88%.

The powdered enamel composition is mixed with an organic diluting oil to permit silk screening of the fluid composition to provide a layer having an ultimate depth on the float glass glazing, after baking, of about 20 μm. The baking of the printed glazing is carried out over a period of about one-half hour at a temperature of 650° C. The printed glazing is allowed to cool slowly.

The ultimate bending strengths of float glass glazing that are coated and those that are uncoated are determined by a measuring device in which the influence of the edges is eliminated. The bending load is increased by advancing a pressure element at a speed of advancement of 2 mm per minute. Thirty individual measurements for both the coated and uncoated float glass glazing were taken and average value measurements were calculated. The average value measurements indicate that the ultimate bending strength of float glass glazings coated with a layer of the enamel composition amount to 85% of the ultimate bending strength of uncoated float glass glazings.

EXAMPLE 2

A base enamel is made to melt as a vitreous matrix for a dark colored composition. The base enamel has the following analysis, in percent by weight, $SiO_2$: 28.78
PbO: 62.89
$B_2O_3$: 3.04
$Na_2O$: 1.41
$K_2O$: 0.74
$Li_2O$: 0.05
ZnO: 0.33
$SnO_2$: 0.66
CaO: 0.05
MgO: 0.07
$Al_2O_3$: 0.03
CoO: 0.38
NiO: 0.40
CuO: 0.40
MnO: 0.34
$Fe_2O$: 0.17
$Cr_2O_3$: 0.28 and a molar ratio of $SiO_2$ to PbO of 1.7. The total of alkaline oxides is 2.20% by weight. The treatment of the base enamel following a first melting, all as described in Example I, is also followed in this Example.

In addition, the various measurements including those of ultimate bending strength, thermal linear thermal expansion coefficient $\alpha 20$-$300$ and the behavior of the base enamel, at the melting point, are taken and data determined in accordance with the discussion in Example I. For the linear thermal expansion coefficient the measurements derive a value for the base enamel of $\alpha 20$-$300 = (76.5 \pm 2) \times 10^{-7}°C.^{-1}$. Since the linear thermal expansion coefficient of the float glazings, see Example I, is $\alpha 20$-$300 - (85 \pm 2) \times 10^{-7}°C.^{-1}$, the ratio of the coefficient of the vitreous matrix of the base enamel to that of the float glass glazing is 90%. The base enamel of Example II was found to have a sintering point of 512° C. and an ash melting point of 745° C.

A colored enamel composition including 78 parts by weight of base enamel, 4 parts by weight of tin dioxide and 18 parts by weight of colored pigments was prepared. The composition included powdered constituents which were mixed and ground wet. Another homogenization of the constituents in a suitable mixer followed a drying step and the powdered composition was applied to float glass glazings for determination of the ultimate bending strength of the coated glazings. The manner of application and the various process steps followed that of Example I.

The determination of ultimate bending strength followed testing of thirty samples of both enamel coated and uncoated flat glass. This determination produced average value measurements following the procedure of Example I. The average value measurements indicate, once again, that the ultimate bending strength of the enameled glazings was only about 15% less than the ultimate bending strength of the uncoated glazings.

EXAMPLE 3

A base enamel is made to melt as a vitreous matrix for a dark colored composition. The base enamel has the following analysis in percent by weight, $SiO_2$: 32.29
PbO: 52.15
$B_2O_3$: 4.63
$Na_2O$: 2.85
$K_2O$: 1.73
$Li_2O$: 0.23
ZnO: 2.15
$SnO_2$: 1.47
CaO: 0.12
MgO: 0.12
$Al_2O_3$: 0.06
CoO: 0.42
MnO: 0.38
NiO: 0.45
CuO: 0.45
$Fe_2O_3$: 0.19
$Cr_2O_3$: 0.31 and a molar ratio of $SiO_2$ to PbO of 2.3. The total of alkaline oxides is 4.81% by weight.

The treatment of the base enamel, following a first melting, all as described in Example I, is followed in this Example. In addition, the various measurements including those of ultimate bending strength, thermal linear expansion coefficient $\alpha 20$-$300$ and the behavior of the base enamel, at the melting point, are taken and data determined in accordance with the discussion in Example I. For the linear thermal expansion coefficient the measurements derive a value for the base enamel of $\alpha 20$-$300 = (77.5 \pm 2) \times 10^{-7}°C.^{-1}$. Since the linear thermal expansion coefficient of the float glass glazings, see Example I, is $\alpha 20$-$300 = (85 \pm 2) \times 10^{-7}°C.^{-1}$ the ratio of the coefficient of the vitreous matrix of the base enamel to that of the float glass glazing is 91%. The base enamel of Example III was found to have a sintering point of 505° C. and an ash melting point of 737° C.

A colored enamel composition including 82 parts of weight of base enamel, 4 parts by weight of tin dioxide and 14 parts by weight of colored pigment was prepared. The composition included powdered constituents which were mixed and ground wet. Following a drying step the constituents were again homogenized in a suitable mixer and the composition was applied to float glass glazings for determination of the ultimate bending strength of the coated glazings. The application of the composition was carried out by silk screening techniques. To this end, the powder of the base enamel is mixed with an organic diluting oil to a consistency allowing printing of the fluid composition in a layer having an ultimate depth on the float glass glazings, after baking, of about 20 μm. The baking of the printing glazings is carried out over a period of about one-half hour at a temperature of 650° C. The printed glazings are allowed to cool slowly.

The determination of ultimate bending strength followed that of Examples I and II, and the ultimate bending strength of the enameled glazings was found to be only about 17% less than the ultimate bending strengths of the uncoated glazings.

EXAMPLE 4

A base enamel is made to melt as a vitreous matrix for a dark colored composition. The base enamel has the following analysis, in percentage by weight, $SiO_2$: 32.28
PbO: 52.15
$B_2O_3$: 4.76
$Na_2O$: 2.06
$K_2O$: 1.13
$Li_2O$: 0.20
ZnO: 3.18
$SnO_2$: 1.47
CaO: 0.27
MgO: 0.20
$Al_2O_3$: 0.10
CoO: 0.42
MnO: 0.38
NiO: 0.45
CuO: 0.45
$Cr_2O_3$: 0.31
$Fe_2O_3$: 0.19 and a molar ratio of $SiO_2$ to PbO of 2.3. The total alkaline oxides is 3.39% by weight.

The treatment of the base enamel, following a first melting, all as described in Example I, is followed in this Example. In addition, the various measurements including those of ultimate bending strength, thermal linear expansion coefficient a 20-300 and the behavior of the base enamel, at the melting point, are taken and data determined in accordance with the discussion in Example I. For the linear thermal expansion coefficient the measurements derive a value for the base enamel of $\alpha 20\text{-}300 = (74\pm2) \times 10^{-7}°C.^{-1}$. Since the linear thermal expansion coefficient of the float glass glazings with a colored enamel layer, see Example I, is $\alpha 2\text{-}0\text{-}300 = (85\pm2) \times 10^{-7}°C.^{-1}$, the ratio of the coefficient of the vitreous matrix of the base enamel to that of the float glass glazing is 87%. The base enamel of Example IV was found to have a sintering point of 528° C. and an ash melting point of 824° C.

A colored enamel composition, except that is included 80 parts by weight of base enamel, 4 parts by weight of tin dioxide and 16 parts by weight of pigment, was treated according to Example III and similarly applied to float glass glazings. The determination of ultimate bending strength followed that of Example III and it was found that the ultimate bending strength of the coated glazings was about 85% of the ultimate bending strength for uncoated glazings.

We claim:

1. An enamel composition having a baking temperature corresponding substantially to the softening temperature of a float glass glazing for forming an enamel coating layer thereon, consisting essentially of
    (a) a vitreous matrix amounting to at least 75% by weight of the enamel composition having the following features
    (1) a composition, by weight, including
        $SiO_2$: 25-33
        PbO: 47-65
        $B_2O_3$: 3-7
        $Na_2O$: 1-4
        $K_2O$: 0-2
        $Li_2O$: 0-0.8
        ZnO: 0.2-5
        wherein the molar ratio of $SiO_2$ to PbO is between 1.6 and 2.7 and the total of alkaline oxides present being less than 5% by weight, and
    (2) a linear thermal expansion coefficient in the range of temperature of 20° to 300° C. less than that of the glazing to be coated;
    (b) pigments; and
    (c) tin dioxide in an amount up to about 5% by weight of the enamel composition.

2. The enamel composition of claim 1 wherein the molar ratio of $SiO_2$ to PbO is between 1.8 and 2.3.

3. The enamel composition of claim 1 wherein the linear thermal expansion coefficient of the vitreous matrix is 75 to 95% of the linear thermal expansion coefficient of the glazing to be coated.

4. The enamel composition of claim 2 wherein the linear thermal expansion coefficient of the vitreous matrix is 75 to 95% of the linear thermal expansion coefficient of the glazing to be coated.

5. The enamel composition of claims 1, 2, 3 or 4 including up to about 1.8% by weight of $SnO_2$ in dissolved form.

6. The enamel composition of claim 5 further including heavy metal oxide in an amount up to about 5% by weight in relation to the composition of the vitreous matrix, and the heavy metal oxide being soluble therein.

7. The enamel composition of claim 6 wherein the heavy metal oxide includes oxides of any one or more of chromium, nickel, cobalt, iron, manganese and copper, and wherein the enamel composition formed is of dark color.

8. The enamel composition of claim 5 wherein the vitreous matrix further contains heavy metal oxide in an amount up to about 5% by weight in relation to the composition of the vitreous matrix, and one or more of calcium oxide, magnesium oxide and aluminum oxide in total amount not to exceed 2% by weight.

9. The enamel composition of claim 8 wherein the heavy metal oxide includes oxides of any one or more of chromium, nickel, cobalt, iron, manganese and copper.

10. The enamel composition of claim 8 wherein the proportion of pigment in the enamel composition is no more than about 18% by weight.

11. The enamel composition of claim 10 wherein the heavy metal oxide includes oxides of any one or more of chromium, nickel, cobalt, iron, manganese and copper.

12. The enamel composition of claim 1 wherein each of the constituents including vitreous matrix, pigment and the tin dioxide are in powder form.

13. The enamel composition of claims 3 or 4 wherein the linear thermal expansion coefficient of the vitreous matrix is 80 to 90% of the linear thermal expansion coefficient of the glazing to be coated.

14. The combination of a float glass glazing and a layer of the enamel composition set out in claim 8 said float glass glazing having the following constituents (in percentage by weight):
    $SiO_2$: 70-73
    CaO: 8-10
    MgO: 3-5
    $Na_2O$: 12-14.5
    $K_2O$: 0-1.

* * * * *